M. A. MARQUETTE.
VULCANIZING DEVICE.
APPLICATION FILED JUNE 10, 1918.
1,301,148.
Patented Apr. 22, 1919.
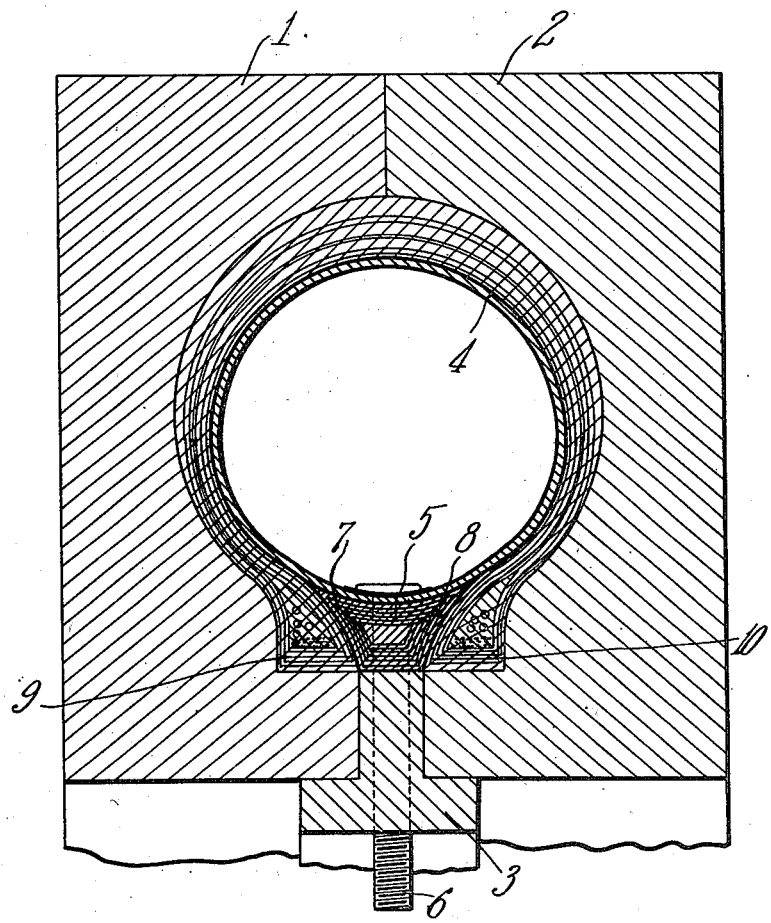
INVENTOR.
Melvon A. Marquette.
BY Chapin + Neal.
ATTORNEYS.

UNITED STATES PATENT OFFICE.

MELVON A. MARQUETTE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

VULCANIZING DEVICE.

1,301,148.      Specification of Letters Patent.      Patented Apr. 22, 1919.

Application filed June 10, 1918. Serial No. 239,198.

*To all whom it may concern:*

Be it known that I, MELVON A. MARQUETTE, a citizen of the United States of America, residing at Springfield, in the county of Hampden and State of Massachusetts, have invented certain new and useful Improvements in Vulcanizing Devices, of which the following is a specification.

This invention relates to an improved device for confining a tire casing in a mold during the vulcanizing operations. It is common practice to confine a tire casing in a closed mold with an inner tube or bag and force water or air through an opening of the latter to force the casing against the interior of the mold where it should be held for the vulcanizing operation.

These so-called air or water bags, as now used, are expensive to manufacture and their life is short. If the bag were made so that it would be practically circular in cross-section when under pressure and made uniformly throughout, it would expand radially and equally and be less liable to distortion than if made otherwise. The objection however, to this practice taken alone is that the casing to be vulcanized under the pressure of the bag is not made circular in cross-section, but is of a "horse shoe" cross-sectional shape, and it is desired to press all parts of the casing against the mold of like interior shape in cross-section.

Various expedients have been used to compromise the shape of the pressure bag with the shape of the tire or casing. For example, the base of the bag has been hardened by building in layers of rubberized fabric at the base of the bag to extend between the bead edges of the casing and permit the bag to expand under pressure to perform its primary function. The result has been a distortion of the bag due to unequal strains causing buckling after short use and, therefore, permitting only a short life for the bag. This difficulty has been recognized as evidenced by the disclosure and the plan of overcoming the difficulty in U. S. Patent No. 1,177,112. So far as I am aware, the difficulties have not been satisfactorily solved heretofore, both because of the expense of using specially constructed bags which are not entirely satisfactory in use or length of life or because the ordinary circular cross-section bag does not perform its functions on the bead or free edges of the tire.

According to my invention, the inexpensive and desired type of pressure bag may be used. That is to say, a bag of uniform construction throughout and of practically circular cross-section under pressure may be used because of my invention, whereby the bag will transmit its pressure uniformly and radially without distorting itself, and the pressure will be transmitted to all parts of the casing. I accomplish this result by providing a structurally separate filling ring to occupy the space between the bead or free edges of the tire and between the base plane of such edges and the bag and so constructing such separate filling ring that the pressure from the bag is transmitted through the ring to the bead edges. The construction of the ring is preferably flexible and so shaped that the pressure will be transmitted to force the tire edges into proper molding position under pressure.

The invention and a means to practice it will be readily understood by reference to the illustrative drawing and description.

The drawing shows in cross-section a separable ring mold with a tire casing, pressure or water bag in place, and the separate ring in position to perform its function.

The mold is shown in cross-section only and comprises the separable sections or halves 1 and 2 and a metal filling ring 3. The top edge of the latter preferably extends to the base plane of the casing. These parts will be readily understood as well as the fact that the interior of the mold is shaped to receive a tire casing in the position indicated.

Following is the specific application of the invention. A pressure or water bag 4 is inserted with the tire casing in the mold. This bag is of uniform construction throughout and is preferably made of rubberized fabric with a valve stem, all essentially like an inner tube except of the rubberized fabric material instead of pure rubber, so that added strength is given for the vulcanizing operations. A separate flexible ring 5 preferably made up of rubberized fabric layers cured to form a single ring is then inserted. This flexible ring is constructed to fill the space between the free ends of the tire casing which would otherwise remain unoccupied if the pressure bag is to be kept in practically circular cross-section when under pressure, which it is according to my invention.

The ring 5 may be made in various ways as, for example, as an endless ring or a split ring, but its main purpose is to fill the space as stated and function as will now be described.

With the insertions as stated, the closing of the mold (well understood in the art) confines the parts as shown. The valve stem 6, of course, extends through the rings 3 and 5. Water, for example, is forced under pressure to the interior of the bag, whereupon the latter assumes a substantially circular cross-section to best transmit the pressure and force the casing to the mold. The ring 5, as stated, is flexible. The ring 3 forms a rigid backing for the body of the flexible ring which is the least flexible part while the most flexible parts 7 and 8 function for my purpose to drive the edges or bead portions firmly into place. It will be clearly seen that the outer curved surface of ring 5 conforms to and supports the bag 4 bridged between the side walls. The pressure of the bag against ring 5 acts to seat it firmly on ring 3 and then acts to spread the wings 7 and 8 with a wedging action to force the bead edges 9 and 10 against the mold. This action is important for the reason that it has heretofore been extremely difficult to hold such bead edges as 9 and 10 against the mold under pressure during the vulcanizing operation. Unless this is accomplished, the edges are not properly formed and joined as one strong structure to the walls of the tire.

The pressure bag thus maintains a practically circular cross-section in action; the pressure is transmitted effectively to the edges of the tire through the flexible ring 5; and in no case is the radial movement of the bag sufficient in extent or directed to distort the bag. When the bag is worn out after an honest and effective life, it may be discarded without discarding the ring 5 which has an independent life in use.

Thus, I have accomplished the object of my invention which is to provide simple, inexpensive, and effective means for pressing a tire casing and all its parts against its mold during vulcanization, whereby the operation of vulcanization can be performed under the desired pressure conditions.

I claim as my invention—

1. The combination of a pressure bag for use in tire casing vulcanization with a separate flexible ring member to bridge the space between the edges of a casing and transmit pressure from the bag to such edges when confined in a mold.

2. The combination of a pressure bag of uniform construction and designed to expand radially and equally in all directions, and a separate flexible filling member to maintain the bag in circular cross-section within a tire casing of "horse shoe" cross-section and transmit pressure from the bag to the edges of the casing when confined in a vulcanizing mold.

3. A flexible filling ring for the purpose described, comprising a body portion and laterally extending wing portions, the latter being more flexible than the body portion.

4. A flexible filling ring for the purpose described having a cross-section of substantially frustoconical form.

5. The combination with a vulcanizing mold for the reception of a hollow tire casing irregular with respect to the hereafter named bag, of an inflatable fluid bag of regular conformation and a yieldable pressure transmitting means, separate from said bag and mold, for transmitting the pressure of said bag to portions of said casing; said bag having a structural conformation adapting it to lie within said casing, when normally expanded, and to press upon the interior of said casing, said bag, when so expanded to its regular conformation, and said casing, having a relative irregularity presented by the casing and said means having a structural conformation adapting it to lie in said irregularity of the casing between said bag and casing to transmit the pressure of said bag to the casing walls of said irregularity; substantially as described.

6. The combination with a vulcanizing mold for the reception of a hollow tire casing having a relatively regular major portion, and a minor portion irregularly and relatively inaccessibly placed with respect to the major portion and presenting edges, of a relatively regular inflatable bag of a structural conformation adapting it, when inflated, to fit within said regular major portion, and yieldable pressure-transmitting means separable from said bag and mold and of a structural conformation adapting it to fit within said minor irregular portion in pressure-transmitting relation to said edges and to said bag, to transmit the pressure of said bag to said edges; substantially as described.

MELVON A. MARQUETTE.